Patented Aug. 21, 1951

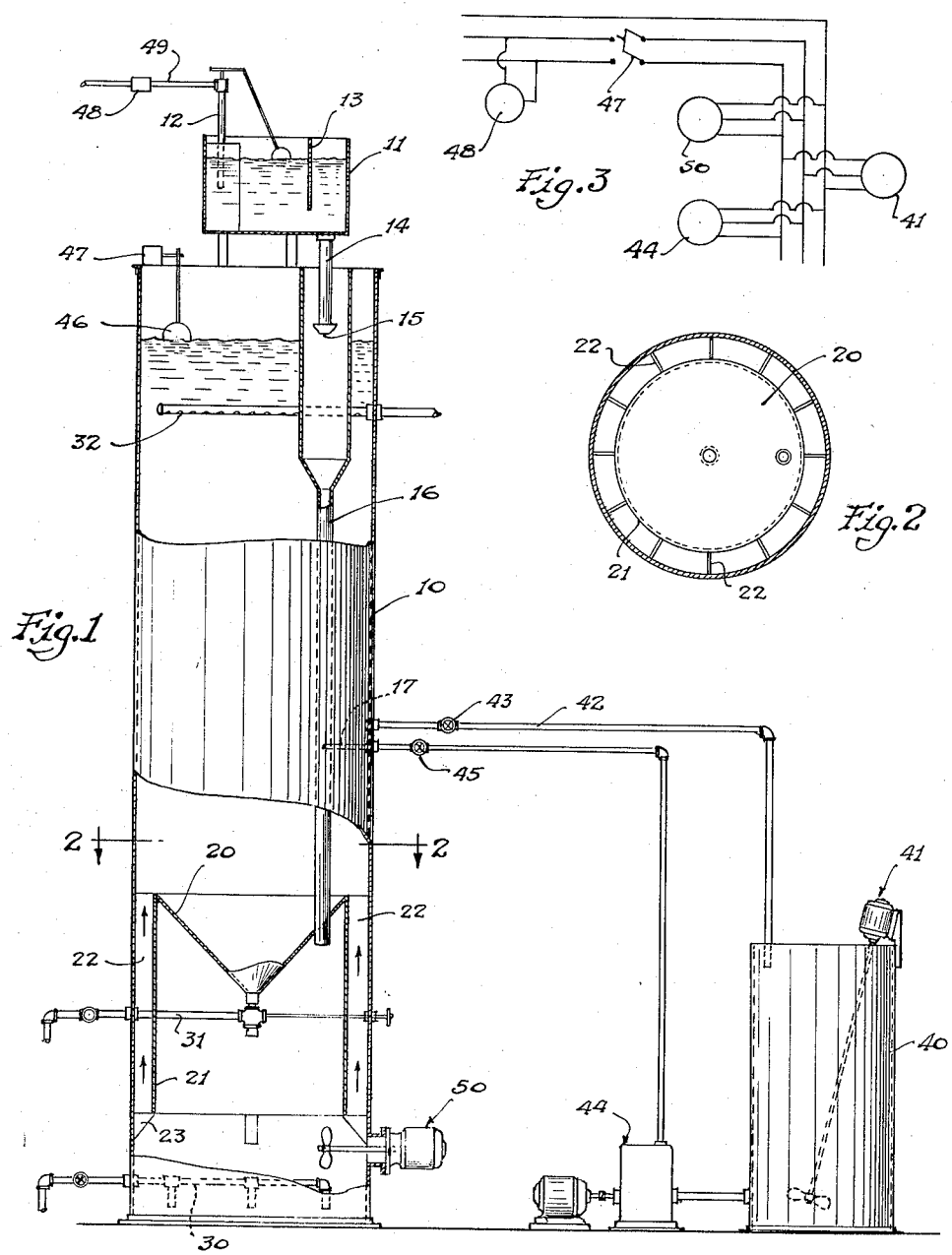

2,565,321

UNITED STATES PATENT OFFICE 2,565,321

WATER TREATMENT

Lowell W. Petersen, Chicago, Ill., assignor to Swift & Company, Chicago, Ill., a corporation of Illinois Application October 30, 1946, Serial No. 706,576

5 Claims. (Cl. 210—16)

This invention relates to means for purifying water and more particularly to an apparatus for treating raw water with chemicals to precipitate out certain dissolved impurities.

It is an object of this invention to provide an improved apparatus for the lime-soda ash treatment of water to precipitate out salts dissolved therein.

It is another object of this invention to provide an improved water treating apparatus having a reacting zone and a settling zone to permit the impurities to be removed from the water.

Further objects will appear from the specification below.

In the drawings:

Figure 1 is a side elevation, partly broken away, showing a preferred form of the apparatus forming the subject of this invention;

Figure 2 is a view taken on line 2—2 of Figure 1; and

Figure 3 is a wiring diagram for the electrical control circuit.

In the past various devices have been proposed for rendering hard water relatively soft by commingling raw water with treating chemicals to effect precipitation of insoluble salts formed by reacting the soluble salts in the water with the lime-soda ash chemicals. This invention is an improvement on known means for this purpose.

The present invention provides an apparatus having two zones: one for reacting the chemicals with the dissolved salts in the raw water, and a second chamber for permitting entrained insoluble materials to precipitate into collecting means from which the precipitate may be removed. Means are provided between the reacting zone and the settling zone to still the flow of water as it moves from one chamber to the other so that the finer particles will more quickly settle out as the water moves toward the outlet.

The apparatus is designed so that the treating chemicals are reacted with the dissolved salts in the presence of the previously formed precipitate. Performance of the reaction under such conditions tends to improve and accelerate the purification treatment of the water.

Referring more particularly to the drawings, the apparatus is built into an elongated vertically extending generally cylindrical chamber 10 having a water-box supply means 11 at the top. Any conventional means may be incorporated in this structure to provide a constant head on the raw water supply but as shown, the water is delivered into the supply means 11 through the inlet pipe 12 and a float valve means is provided in the box to keep the raw water level in the box substantially constant. The box is provided with baffle 13 to smooth the flow of water through the box, the baffle being raised somewhat from the bottom of the tank to permit the flow of water from the inlet of the box to the outlet.

The water flows from the outlet of the box into the supply pipe 14 which delivers the water to a suitable orifice 15. The water which is delivered under the constant head to the orifice is thus metered and flows from the orifice in the pipe 16 to the reacting zone at the bottom of chamber 10. At a point substantially simultaneous with the passage of the raw water into the reacting zone or just before, suitable quantities of treating chemicals are delivered into the pipe 16 through inlet line 17.

At the bottom of chamber 10 a means is provided to divide the chamber as between the reacting zone located at the bottom and the settling zone which occupies the remainder of tank 10. The means for dividing the tank into the two chambers preferably takes the form of a relatively short inverted cone 20 which is supported around its upper end and is integral with a cylindrical wall 21 forming an inverted cup-shaped structure. The cylinder 21 has a diameter somewhat smaller than that of the inside of tank 10 and it is of a length about equal to or slightly longer than the cone. Suitable vanes 22 are provided between the wall of tank 10 and the cylinder 21 to hold the cylinder spaced from the walls of, and generally concentrically within, the tank 10. The cylinder 21 with the cone-shaped cap 20 assembled thereon may be positioned at any point vertically within the tank 10 by the brackets 23 fixed to the wall of the tank 10.

The water supply pipe 16 passes downwardly inside the tank 10 and is located within the tank in such position as to engage the cone assembly at substantially the junction between the cylinder wall 21 and the upper end of the inverted cone 20. The pipe 16 is connected to the cone so that the water and treating chemicals are delivered through the cone to the underside of the cone and into the reacting zone which is defined by the underside of the inverted cone and the inside of the cylinder 21.

As the water and treating chemicals move downwardly through the reacting zone, the soluble salts combine with the treating chemicals to form insoluble precipitates which drop to the floor of chamber 10 and suitable collecting means 30 with downwardly projecting pick-ups are provided at the bottom of tank 10 to remove the precipitate to the outside of the chamber. An ejector or other suction means may then be used to suck the precipitate into the pick-ups for disposal.

After the water passes through the reacting chamber, it then flows upwardly around the outside of cylinder 21 in chamber 10 and into the settling zone. As the water passes upwardly between the vanes or spacers 22 the heavier particles of the precipitate fall back to the bottom of chamber 10 and after the water flows into the settling zone where the water moves more slowly, the finest particles of insoluble salts fall downwardly and are collected in the inverted cone 20. The cone is provided with a three-way valve at an outlet opening provided at its very bottom and at one setting of the valve these finest of the precipitate particles may be removed to the outside of the chamber 10 through a connection 31. Alternatively the finer precipitates may be allowed to fall directly from the inverted cone through the outlet into the reacting zone, where the fine precipitate particles tend to promote the reaction between the soluble salts and treating chemicals flowing through the reaction zone.

When the treated water reaches the top of chamber 10 it may be withdrawn through suitable collecting means. The preferred form of collecting means, as here shown, is a piping arrangement 32 laid out in a rough circle around the inside of chamber 10. A plurality of inlet openings may be provided in the pipe whereby the softened water flows into the outlet means without creating any turbulent flow conditions.

The treating chemicals as lime and soda ash may be mixed into a concentrated slurry or solution before delivery into the reaction zone, and this is done in a vessel 40 having an agitator 41 associated therewith. Previously treated, i. e. softened water, may be withdrawn from tank 10 and conducted into the vessel 40 through pipe 42 having a valve 43 for controlling the flow. The chemicals and water are thoroughly mixed together and are then forced by pump 44 into delivery pipe 17 connected with the raw water infeed line 16. A valve 45 may be provided to control the flow of the treating chemicals into the reaction zone.

At the top of tank 10 a float 46 is provided which actuates an electrical switch 47 which operates means to initiate and discontinue the flow of raw water and treating chemicals. When the water level in tank 10 falls, switch 47 is operative to open a solenoid operated valve 48 in an infeed line 12 to the constant level water-box supply 11. Also, this operation of switch 47 causes the agitating means 41 and pump 44 to be energized. Until the level of water in tank 10 is built up, this condition prevails and raw water is continuously treated. When the level of the water in tank 10 reaches a peak, the float is lifted to reverse the action of switch 47 whereby valve 48 is closed and the motors of agitator 41 and pump 44 are deenergized.

If desired, an agitator 50 may be positioned in the reaction zone of tank 10. The motor driving this means may be connected into the circuit with switch 47 to be energized along with pump 44 and when the flow of raw water takes place.

In the operation of the device described above, the raw water is delivered into the float controlled water-box supply. The water flows from the supply box down through the orifice 15 and water is supplied to the apparatus through an orifice under a constant head. In the continuous operation of the device a metered quantity of water is delivered through the apparatus by this means so that the reacting time and settling time can be properly controlled to permit the reaction to go to completion and to permit the insoluble precipitate to fall to the bottom of the apparatus.

As the water flows downwardly, measured quantities of the treating chemicals are injected into the measured quantities of water in the infeed stream and the mixture is delivered to the reacting zone under the inverted cone. The chemicals react with the soluble salts in the water to form insoluble precipitates, the larger masses of which fall to the floor of chamber 10, and the reaction proceeds as the mixture flows downwardly through the reacting zone. The performance of the reaction in the presence of previously reacted material causes a reaction to be performed under most favorable conditions, and the agitator 50 insures a proper turbulence to bring all phases of the reacting materials together. After the fluid passes from the vicinity of the reaction zone, the turbulence of the flow lessens as the flow passage increases in volume so that as the materials move up through the space provided between the outside of cylinder 21 and the inside of the chamber 10, as the fluids move through this part of the apparatus, the turbulence is further smoothed out by the spacers 22, and the heavier insoluble particles fall downwardly to be collected on the bottom of the chamber 10.

After the material passes above the upper end of cylinder 21 it passes into a zone where the settling out of the insoluble precipitates is completed and, thereafter, the fluid masses move very slowly upwardly toward the outlet means 32. As the treated water flows upwardly the finer insoluble precipitates carried over into this zone by the faster flow of the fluids settle downwardly and are collected in the inverted cone 20. These finer particles of the precipitate may be delivered from the lower end of the cone into the reaction zone to aid in performing the reaction between the treating chemicals and soluble salts or, if they are not needed for this purpose, they may be withdrawn from the outlet pipe 31.

After the treated water passes through the top of the settling chamber it is withdrawn through the oulet water collecting means 32.

This apparatus is particularly adapted for a semi-automatic performance of the conventional lime-soda ash treatment of hard water to remove soluble salts which would otherwise interfere with the proper utilization of the water. The quantities of lime and soda ash to be used, are well known factors and form no part of the invention here described.

The above described apparatus forms the preferred embodiment of this invention. Modifications or equivalent structures may readily occur to those skilled in the art, which will fall within the scope of the following claims.

I claim:

1. An apparatus for purifying water comprising a vertically extending elongated chamber, said chamber having a lower reacting zone and an upper settling zone, means to separate said zones, said means taking the form of an inverted cone and a cylindrical wall, said cone being supported at and integral with the upper end of the cylindrical wall, said cylindrical wall having a diameter smaller than that of said chamber to provide a flow passage between the outer face of the cylinder and the inner side of the wall of the chamber, vertically extending spacing means to hold said cylindrical wall generally concentrically within said chamber, means to feed raw water and treating chemicals into said lower reacting zone and immediately under the uppermost end of said inverted cone, said mixture flowing downwardly between the cone and the cylindrical wall and then flowing upwardly through said passage into said settling zone, means to withdraw the softened water from near the top of the chamber, means to withdraw the precipitates falling into the cone and from the floor of the reacting zone, means to preliminarily mix softened water with the treating chemicals to form a concentrated mixture, and said means to feed raw water and the concentrated mixture into the reacting chamber being directed downwardly after the concentrated mixture is comingled with the raw water so that any precipitate formed may pass to said withdrawal means.

2. An apparaus for purifying water comprising a vertically extending elongated chamber, said chamber having a lower reacting zone and an upper settling zone, means to separate said zones, said means being movable longitudinally for positioning it in the chamber, said means taking the form of an inverted cone and a cylindrical wall, said cone being supported at and integral with the upper end of the cylindrical wall, said cylindrical wall having a diameter smaller than that of said chamber to provide a flow passage between the outer face of the cylinder and the inner side of the wall of the chamber, vertically extending spacing means to hold said cylindrical wall generally concentrically within said chamber, means to feed raw water and treating chemicals into said lower reacting zone and immediately under the uppermost end of said inverted cone, said mixture flowing downwardly between the cone and the cylindrical wall and then flowing upwardly through said passage into said settling zone, means to withdraw the softened water from near the top of the chamber, means to withdraw the precipitates falling into the cone and from the floor of the reacting zone, means to draw softened water from said chamber and preliminarily mix the softened water with the treating chemicals to form a concentrated mixture, and said means to feed raw water and the concentrated mixture into the reacting chamber being directed downwardly after the concentrated mixture is comingled with the raw water so that any precipitate formed may pass to said withdrawal means.

3. An apparatus for purifying water comprising a vertically extending elongated chamber, said chamber having a lower reacting zone and an upper settling zone, means to separate said zones, said means being movable longitudinally for positioning it in the chamber, said means taking the form of an inverted cone and a cylindrical wall, said cone being supported at and integral with the upper end of the cylindrical wall, said cylindrical wall having a diameter smaller than that of said chamber to provide a flow passage between the outer face of the cylinder and the inner side of the wall of the chamber, vertically extending spacing means to hold said cylinder wall generally concentrically within said chamber, means to feed raw water and treating chemicals into said lower reacting zone and immediately under the uppermost end of said inverted cone, said mixture flowing downwardly between the cone and the cylinder wall and then flowing upwardly through said passage into said settling zone, means to withdraw the treated water from near the top of the chamber, means to withdraw the precipitate from the floor of the reacting zone, means to control the removal of precipitate from the cone means connected into the settling zone to draw softened water from said chamber, means to preliminarily mix the softened water withdrawn through said connecting means with the treating chemicals to form a concentrated mixture, and said means to feed raw water and the concentrated mixture into the reacting chamber being directed downwardly after the concentrated mixture is comingled with the raw water so that any precipitate formed may pass to said withdrawal means.

4. Water purification apparatus including a vertically extending container forming an elongated chamber, a vertically extending wall within a portion of said chamber with substantially the same cross-sectional configuration as that of the container, the periphery of said wall being slightly smaller than the inner face of the container, whereby a passage is formed about said wall, a concave cap attached to the upper portion of said wall and forming with the wall an inverted cup-shaped structure, said structure dividing said chamber into an upper settling zone and a lower reacting zone which zones are in communication through said passage, means to withdraw softened water from the upper zone, means to withdraw precipitates from the lower reacting zone, means to introduce raw water and treating chemicals into an upper portion of said lower reacting zone, a three-way valve within the container, said valve having an intake and two discharge openings, the intake of said valve being connected to a lower portion of the cap, one discharge opening of the valve leading to an upper portion of the reacting zone, means connecting the other discharge opening of the valve to a point outside the container, and means to operate the valve from outside the container whereby fine precipitates settling onto the cap may fall into the reacting zone with one setting of the valve while the setting of the valve may be changed to discharge the accumulation of fine precipitates to a point outside the container.

5. Water purification apparatus including a vertically extending container forming an elongated chamber, a vertically extending wall within a portion of said chamber with substantially the same cross-sectional configuration as that of the container, the periphery of said wall being slightly smaller than the inner face of the container, whereby a passage is formed about said wall, a concave cap attached to the upper portion of said wall and forming with the wall an inverted cup-shaped structure, said structure dividing said chamber into an upper settling zone and a lower reacting zone which zones are in communication through said passage, means to withdraw softened water from the upper zone, means to withdraw precipitates from the lower reacting zone, a three-way valve within the container, said valve having an intake and two discharge openings, the intake of said valve being connected to a lower portion of the cap, one discharge opening of the valve leading to an upper portion of the reacting zone, means connecting the other discharge opening of the valve to a point outside the container, means to operate the valve from outside the container whereby fine precipitates settling onto the cap may fall into the reacting zone with one setting of the valve while the setting of the valve may be changed to discharge the accumulation of fine precipitates to a point outside the container, and means to introduce raw water and treating chemicals into an upper portion of said lower reacting zone, said last mentioned means including a pipe extending into the lower reacting zone with the discharge end of the pipe being located adjacent the upper end of said lower zone, means adjacent the other end of the pipe for introducing raw water into the pipe, and means intermediate of said ends for introducing the treating chemicals into the pipe, the portion of said pipe between the point of introduction of said treating chemicals into the pipe and the outlet end of the pipe being directed downwardly to facilitate the discharge of any precipitates formed within said pipe.

LOWELL W. PETERSEN.

REFERENCES CITED

The following references are of record in the file of this patent:

UNITED STATES PATENTS

| Number | Name | Date |
| --- | --- | --- |
| 1,199,098 | Munzer | Sept. 26, 1916 |
| 2,054,798 | Gibson | Sept. 22, 1936 |
| 2,223,892 | Lawlor | Dec. 3, 1940 |
| 2,352,772 | Darby | July 4, 1944 |
| 2,382,490 | Lawlor | Aug. 14, 1945 |
| 2,383,086 | Sebald | Aug. 21, 1945 |